United States Patent [19]

Ohmura et al.

[11] Patent Number: 4,739,360
[45] Date of Patent: Apr. 19, 1988

[54] LIGHT METERING DEVICE FOR CAMERA

[75] Inventors: Hiroshi Ohmura, Saitama; Tokuichi Tsunekawa, Kanagawa, both of Japan

[73] Assignee: Canon Kabushiki Kaisha

[21] Appl. No.: 855,173

[22] Filed: Apr. 22, 1986

[30] Foreign Application Priority Data

Apr. 25, 1985 [JP] Japan .................. 60-089186

[51] Int. Cl.[4] .................. G03B 7/099
[52] U.S. Cl. .................. 354/429; 354/476; 354/479
[58] Field of Search .................. 354/429, 476, 479

[56] References Cited

U.S. PATENT DOCUMENTS

| | | | |
|---|---|---|---|
| 3,521,542 | 7/1970 | De Goederen | 354/476 |
| 3,612,703 | 10/1971 | Irisawa et al. | 354/429 X |
| 4,544,269 | 10/1985 | Nose et al. | 354/429 X |

FOREIGN PATENT DOCUMENTS

| | | | |
|---|---|---|---|
| 0181030 | 10/1983 | Japan | 354/476 |
| 0032031 | 2/1985 | Japan | 354/476 |

*Primary Examiner*—Michael L. Gellner
*Attorney, Agent, or Firm*—Toren, McGeady & Associates

[57] ABSTRACT

A light metering device for single lens reflex camera having photoelectric transducer elements arranged in the optical path of a finder thereof. The photoelectric transducer elements are arranged ahead of a focusing screen as viewed from the direction of finder light, and an area corresponding to a clear portion of the focusing screen is made either to have a photoelectric transducer structure of narrower width than in the environmental area, or to be light-metered by another or separate light metering optical system.

9 Claims, 4 Drawing Sheets

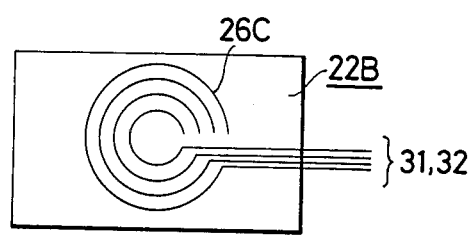
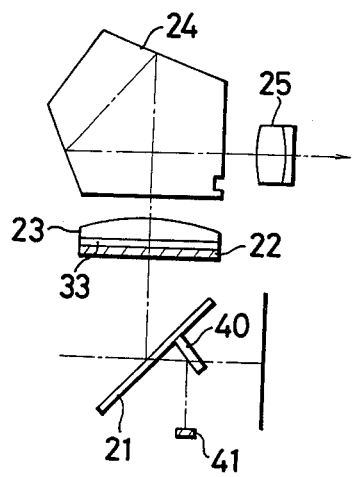
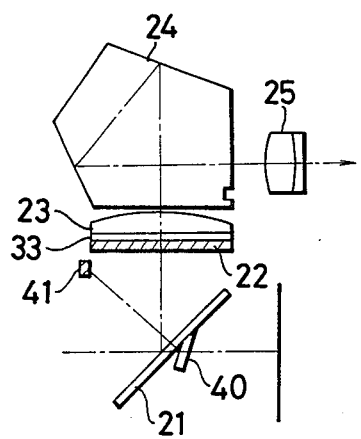

LIGHT METERING DEVICE FOR CAMERA

BACKGROUND OF THE INVENTION

1. Field of the Invention

This invention relates to light metering devices, and, more particularly, to light metering devices for single lens reflex cameras.

2. Description of the Prior Art

In the past, the light metering devices using a light beam splitting member, for example, a micro beam splitter formed in, for example, the condenser lens so that light is directed to the photosensitive element, or a Fresnel lens positioned on the exit face of the pentagonal roof type prism to concentrate light, have been proposed. These two types had drawbacks that the light distribution over the field of view of the finder was degraded, or when altering the light metering mode, it was necessary to interchange the light beam splitting member.

FIGS. 1 and 2 show an example of each of the conventional types of light metering devices. In FIG. 1, light coming from an object to be photographed and entering through a photographic lens 1 of the single lens reflex camera is reflected upward by a reflex mirror 2 and passes through a focusing screen 3, a light beam splitting member 4, a photosensitive element 5, a condenser lens 6, and a pentagonal prism 7 to an eyepiece lens 8. In this type, when the object is observed through the eyepiece lens 8, that part of the light which travels through the light beam splitting member 4 is shut out. Thus, there is produced a bad effect of casting a shadow on the central portion of the viewfield of the finder. Also the light metering modes of the camera are the center-weighted light metering with a heavy emphasis on the central portion of the area of the image format, and the average light metering mode with uniform emphasis on the overall area of the field. Because the region of the light rays to be taken in the photosensitive element 5 is determined by the shape of the light beam splitting member 4, when it is desired to change the light metering area, the condenser lens 6, having the light beam splitting member 4 formed therein, must be replaced.

In the conventional example of FIG. 2, the object light emerging from the photographic lens is reflected by the reflex mirror 2 to a focusing screen 9 and further directed through the pentagonal prism 7 to the eyepiece lens 8. Meanwhile, by means of a Fresnel lens 10 positioned on the exit face of the pentagonal prism 7, light is concentrated on the photosensitive element 5 confronting the exit face. In this case, though the central portion of the viewfield of the finder is not darkened as in the case of FIG. 1, it is very difficult to selectively operate many light metering modes such as those mentioned above.

SUMMARY OF THE INVENTION

An object of the present invention is to provide a light metering device for a single lens reflex camera in which photoelectric transducer elements for light metering are provided in the optical path of a finder optical system, whereby no bad influence of the photoelectric transducer elements is given to the field of view of the finder.

Other objects of the invention will become apparent from the following detailed description of embodiments thereof.

BRIEF DESCRIPTION OF THE DRAWINGS

FIG. 6 is a plan view of a second embodiment of a photoelectric transducer element assembly according to the invention.

FIG. 7 is a longitudinal sectional view of a camera optical system using the photoelectric transducer element assembly of FIG. 6.

FIG. 8 is a longitudinal sectional view of a third embodiment of the camera optical system according to the invention.

DETAILED DESCRIPTION OF THE PREFERRED EMBODIMENTS

A prototype of the light metering device for a single lens reflex camera of the invention is disclosed in U.S. patent application Ser. No. 770,162 filed Aug. 27, 1985 assigned to the assignee of the present invention, where photoelectric transducer elements formed to a fine width are provided in the optical path of the finder at a position adjacent the focusing screen. This proposal is that the photoelectric transducer elements, whose width is a few microns and which are made of, for example, amorphous silicon, are formed in comb teeth-like shapes not only in the central area of the view field but also the environmental area surrounding that central area. And, because this photoelectric transducer element is only a few microns in width, no bad influence is given to the finder image.

The present invention is next described in detail in connection with embodiments thereof by reference to FIG. 3 and those that follow.

Figure 1:
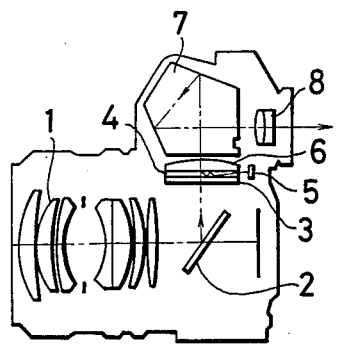
FIGS. 1 and 2 are longitudinal sectional views of the conventional camera optical systems.
Figure 2:
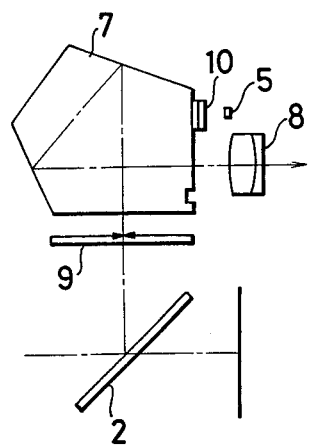
Figure 3:
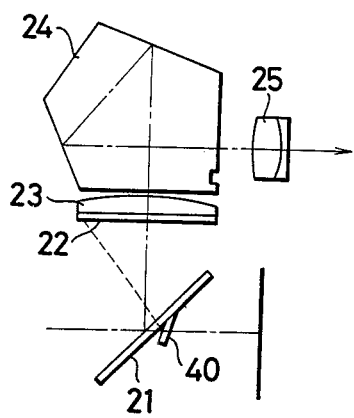
FIG. 3 is a longitudinal sectional view of a first embodiment of a camera optical system according to the invention.
Figure 4:
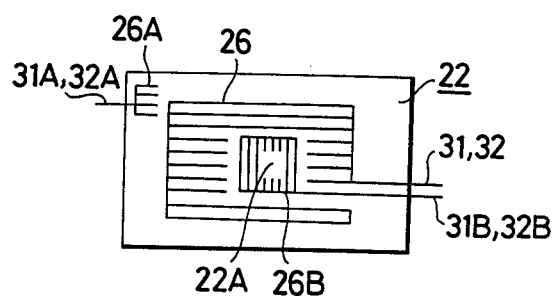
FIG. 4 is a plan view of the photoelectric transducer elements of FIG. 3.

FIG. 3 is a sectional view of the optical system of single lens reflex camera to which the present invention is applied as a first embodiment; FIG. 4 is a plan view of an example of arrangement of photoelectric transducer elements forming photoelectric transducer means; and FIG. 5 is a perspective view of the body of the photoelectric transducer elements.

In FIG. 3, light coming from an object to be photographed and entering through a photographic lens (not shown) is reflected by a known reflex mirror 21 and passes through photoelectric transducer elements 22 provided at a position somewhat displaced from a focusing screen toward the lens side (reflex mirror 21 side), a condenser lens 23 arranged adjacent thereto, and a pentagonal prism 24 to an eyepiece lens 25. Photoelectric transducer elements 22 are constructed, as shown in FIG. 4, as an array of comb tooth-shaped photoelectric transducer element bodies 26, 26A and 26B.

Figure 11:
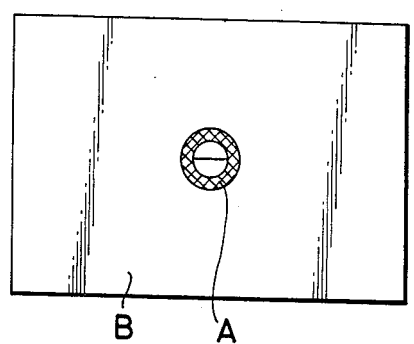
FIG. 11 is a plan view of the general focusing screen.

In the case of the photoelectric transducer element assembly 22 in this embodiment, it is in a central portion 22A of the photoelectric transducer element assembly 22, corresponding to a clear portion or split image portion which exists in a central portion A of a focusing screen shown in FIG. 11 positioned in a focal plane, that no photoelectric element body is provided in order to give no bad influence on the finder viewfield image.

Figure 5:
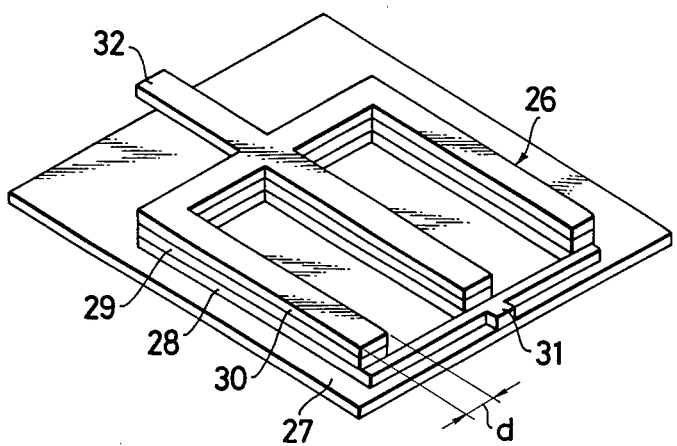
FIG. 5 is a perspective view in enlarged scale, of the structure of the photoelectric transducer element of FIG. 4.

The structure of this photoelectric transducer element body 26, 26A, 26B is shown in FIG. 5 (where the element bodies 26A and 26B have the same structure as that of the element body 26, and here their explanation is omitted). On a glass plate 27 is arranged a lower electrode 28. On the lower electrode 28, there are then arranged a photoelectric transducer element 29 and an upper electrode 30, in laminated relation, having similar comb-tooth shapes. The width, d, of the corresponding constituent substance to the comb-tooth portions and back portions are formed by fine lines of about several tens of microns and are easy to fabricate. It should be noted that despite the photoelectric transducer element assembly 22 having such a wide width, d, almost no shadow of the photoelectric transducer element assembly 22 is formed on the finder viewfield image due to the diffusing action of light formed on the matted surface B of the focusing screen (shown in FIG. 11) arranged on the rear (pentagonal prism 24) side of said element assembly 22. Connected to the end portions of electrodes 28 and 30 are lead wires 31 (31A, 31B) and 32 (32A, 32B). The lower electrode 28, photoelectric transducer element 29, upper electrode 30 and lead wires 31 (31A, 31B) and 32 (32A, 32B) are unified. The comb tooth-shaped photoelectric transducer elements 22 are arranged in a number of divided blocks so that they can correspond to various light metering modes. By changing over circuits connecting the lead wires 31 (31B) and 32 (32B) connected to the respective electrodes 28 and 30, the photoelectric transducer element bodies 26 and 26B can be used either independently or in combination. It sould be noted that, the changeover circuit for the light metering modes has already been proposed and here its explanation is omitted.

If CdS or amorphous Si is used as the photoelectric transducer element 29, due to their low transmittances to visible light, the viewfield of the finder is obscured. But, though the width, d, of the tooth portion of the photo-electric transducer body 26 is about several tens of microns, because the diffusing or matted surface B of the focusing screen (shown in FIG. 11) lies above it or at the focal plane, as has been described above, the naked eye cannot perceive the photoelectric transducer element assembly 22, and no bad influence is given to the viewfield of the finder.

Concerning the light metering of the central portion 22A in the photoelectric transducer element assembly 22, which corresponds to the clear portion A or split image portion of the focusing screen (shown in FIG. 11), as shown in FIG. 3, light is conducted to the photoelectric transducer element body 26A shown in FIG. 4 by using a mirror 40 provided in the rear of the reflex mirror 21. At this time, even though the width of the photoelectric transducer element body 26A is several tens of microns, for the same reason as described above, because the presence of the matted surface B of the focusing screen which diffuses light in rear (on the pentagonal prism 24 side) of the element body 26A, it is impossible to see the details of the shadow of the photoelectric transducer element body 26A by the naked eye. Therefore, there is no possibility of giving any bad influence to the viewfield of the finder. Further, since CdS or amorphous Si is amenable to vacuum evaporation on a mother material, such as the electrodes 28, 30, the photoelectric transducer element body 26 can be formed with ease, and the pattern of each of the comb tooth-shaped regions can be constructed freely, so that the selection of the partial light metering, center weighted light metering, average light metering and other light metering modes can be realized with ease by combination. It should be noted that the photoelectric transducer element 29 may be made up by using another material instead of CdS or amorphous Si.

In the arrangement of the photoelectric transducer elements shown in FIG. 4, the split image portion of the focusing screen plate (shown in FIG. 11), that is, the clear portion A, is not provided with a photoelectric transducer element body, while the corresponding portion to the matted surface B, other than the clear portion A, has the photoelectric transducer element bodies of several tens of microns wide.

The reason why it is arranged as such is that if a photoelectric transducer element body of a few microns wide is provided in a corresponding position to the clear portion in order to prevent the shadow of the photoelectric transducer element body from being projected to the finder as in the previously proposed light metering device, as the fabrication of the photoelectric transducer element body becomes difficult, a problem of increasing the cost is produced.

FIGS. 6 and 7 illustrate a second embodiment of the invention. A photoelectric transducer element assembly 22B, of FIG. 6 has photoelectric transducer element bodies 26C arranged in concentric relation. In the case of this embodiment, too, a central portion of the photoelectric transducer element assembly 22B corresponding to the clear portion of the focusing screen plate, is not provided with a photoelectric transducer element body in order to prevent a bad influence on the finder.

An optical system for the photoelectric transducer element assembly of FIG. 6 comprises, as shown in FIG. 7, a reflex mirror 21, a focusing screen plate 33, a condenser lens 23, a pentagonal prism 24 and an eyepiece lens 25 arranged in this order in a direction in which light from an object to be photographed passes. In the case of this embodiment, the light metering of the corresponding portion to the clear portion of the central portion of the focusing screen plate 33 is performed by another photoelectric transducer element 41 (for example, SPD) arranged to receive the central part of the object light split by a half-mirrored central portion of the reflex mirror 21 of known construction and reflected by a sub-mirror 40 positioned in rear of the reflex mirror 21.

In the optical system of FIG. 8 as a third embodiment of the invention, the reflex mirror 21, photoelectric transducer element assembly 22, focusing screen plate 33, condenser lens 23, pentagonal prism 24 and eyepiece lens 25 are arranged in this order from front to rear. Similar to the embodiment shown in FIG. 7, the light metering of the corresponding central portion of the photoelectric transducer element assembly 22 to the central clear portion (split image portion) of the focusing screen plate 33 is performed by conducting a light which will enter the central portion to another photoelectric transducer element 41 (for example, SPD) by a sub-mirror 40.

Figure 9:
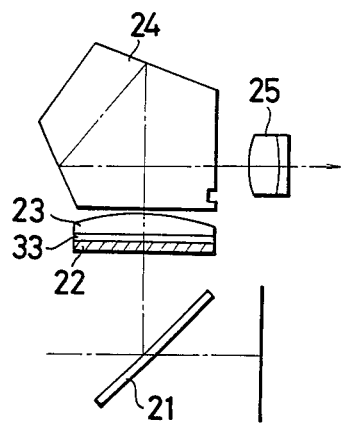
FIG. 9 is a longitudinal sectional view of a fourth embodiment of the camera optical system according to the invention.
Figure 10:
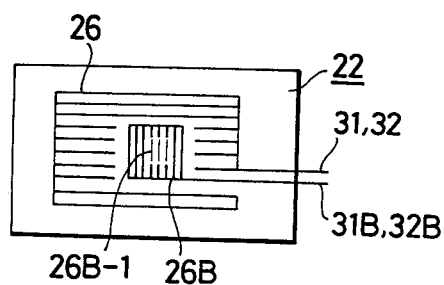
FIG. 10 is a plan view of the photoelectric transducer element assembly of FIG. 9.

Next, referring to FIGS. 9 and 10, a fourth embodiment of the invention is described. This fourth embodiment is different from the above-described first to third embodiments in the method. A central portion of the photoelectric transducer element assembly 22 positioned below (reflex mirror 21 side) the focusing screen plate 33, that is, a region corresponding to the central clear portion A (split image portion) shown in FIG. 11 of the focusing screen plate 33, is provided with a photoelectric transducer element body 26B-1 whose width, d, is made several microns or less. That is, the region of the photo-electric transducer element assembly 22 corresponding to the diffusing matted surface B (shown in FIG. 11) of the focusing screen plate 33 has photoelectric transducer element bodies 26, 26B of several tens of microns width which are easy to form. Meanwhile, it is in a region corresponding to the central clear portion A (shown in FIG. 11) of the focusing screen plate 33 that the photoelectric transducer element body 26B-1 of a width of less than several microns is formed. Therefore, even in the region of the clear portion A of the focusing screen plate 33, it is made possible to avoid the bad influence of this photoelectric transducer element body 26B-1 on the finder viewfield image. It should be noted that the above-described photoelectric transducer element bodies 26 and 26B of several tens of microns wide correspond to the diffusing matted portion B of the focusing screen plate 33. Therefore, similarly to the above-described first to third embodiments, no bad influence is given to the finder viewfield image.

The fabricating and assembling of the above-described photo-electric transducer element body 26B-1 of several microns wide is not easy. But, this portion accounts for a very small proportion of the entire area of the photoelectric transducer element assembly. Therefore, the problem does not become very serious in the point of fabricating and assembling.

As has been described above, the first to fourth embodiments have common advantages described below. Firstly, because most of the photoelectric transducer element bodies of fine width of the photoelectric transducer element assembly can be formed to several tens of microns in the width which is easy to fabricate, as compared with the method of fabricating the previously proposed photoelectric transducer element bodies which are all fabricated to a width of less than several microns, the price becomes cheaper, and the fabricating steps become simpler.

Also, secondly, despite the photoelectric transducer elements for metering light being provided in the optical path of the finder optical system, no bad influence on the viewfield of the finder is produced by the photoelectric transducer elements.

Also, thirdly, because the photoelectric transducer element bodies are divided into a plurality of blocks, their combinations allow for easy selection of many light metering modes.

Also, fourthly, because the photoelectric transducer element bodies are formed by vacuum evaporation, they can be manufactured economically.

Also, fifthly, because the light metering is taken near the focal plane, the proportionality of the light metering to F-number is good, and correction of the full open number becomes unnecessary.

Also, sixthly the light metering optical system of the camera becomes simple, so that a simplification of the lens structure can be achieved.

What is claimed is:

1. A light metering device for a camera having a finder optical system with a focusing screen plate having a clear portion formed therein and arranged in said system, comprising:
   a photoelectric transducer arranged in advance of said focusing screen plate of said finder optical system on an optical path, including:
   a first photoelectric transducer element of fine width arranged in a finder optical path corresponding to that area of said focusing screen plate which is other than said clear portion; and
   a second photoelectric transducer element of fine width arranged in the finder optical path corresponding to said clear portion of said focusing screen plate, said second photoelectric transducer element being narrower in width than said first photoelectric transducer element.

2. A camera according to claim 1, wherein the width of said first photoelectric transducer element is on the order of several tens of microns, and the width of said second photoelectric transducer element is on the order of several microns.

3. A light metering device for a camera with a member having a light diffusing area and a clear area arranged in an optical path of a finder optical system, comprising:
   photoelectric transducer means arranged in the optical path ahead of said member of said finder optical system, including:
   a first photoelectric transducer element of fine width arranged in the finder optical path corresponding to said light diffusing area other than said clear area of said member; and
   a second photoelectric transducer element of fine width arranged in the finder optical path corresponding to said clear area of said member, said second photoelectric transducer element being formed narrower in the width than said first photoelectric transducer element.

4. A camera according to claim 3, wherein the width of said first photoelectric transducer element is on the order of several tens of microns, and the width of said second photoelectric transducer element is on the order of several microns.

5. A light metering device for a camera with a focusing screen plate having a light diffusing area and a clear area arranged in an optical path of a finder optical system, comprising:
   (a) first photoelectric transducer elements arranged near but in advance of said screen plate on the optical path, said elements being formed with fine width arranged in an optical path corresponding to said diffusing area;
   (b) a light metering optical system for metering light of the finder optical path corresponding to said clear area of said plate, said light metering optical system comprising a different optical axis center from said finder optical system; and
   (c) second photoelectric transducer elements arranged in the optical path of said light metering optical system, said second photoelectric transducer elements being arranged on the same plane as the first photoelectric transducer elements, but outside the optical path of the finder optical system.

6. A camera according to claim 5, wherein the width of said first photoelectric transducer elements are made on the order of several tens of microns.

7. A camera according to claim 5, further comprising: said light metering optical system having a reflecting member for reflecting an optical path portion corresponding to said clear portion of said focusing screen plate to a direction different from to the optical axis center of said finder optical system.

8. A camera according to claim 6, wherein the width of said second photoelectric transducer elements are made on the order of several tens of microns.

9. A camera according to claim 5, wherein said first and said second photoelectric transducer elements are constructed with the same element.

* * * * *